Patented Apr. 5, 1938

2,113,300

UNITED STATES PATENT OFFICE 2,113,300

MANUFACTURE OF HIGHER MIXED ESTERS OF CELLULOSE

Charles R. Fordyce and John Emerson, Rochester, N. Y., assignors, by mesne assignments, to Eastman Kodak Company, Jersey City, N. J., a corporation of New Jersey No Drawing. Application November 23, 1935, Serial No. 51,335

7 Claims. (Cl. 260—101)

The present invention relates to the production of mixed esters of cellulose, especially those containing higher fatty acid groups, in an esterification bath in which a water soluble aliphatic ester is employed as the solvent.

In the preparation of mixed esters of cellulose, especially those containing higher fatty acid radicals such as stearyl, a solvent should be present to render the esterification bath homogeneous. Various solvents have been suggested in this connection such as ethylene chloride, toluene or the like. It has been necessary upon the completion of the reaction in which those solvents were employed to precipitate the resulting ester from the reaction mixture by means of an organic liquid with which the solvent was miscible. This not only contributed to the expense of the process but also in view of the fact that most organic liquids are inflammable and many of them are volatile or toxic or both, a process in which water may be employed as the precipitant constitutes an improvement thereof.

We have found that the water soluble aliphatic esters may be used as esterification solvents in the production of mixed cellulose esters and the esters may be precipitated from the reaction mixtures in water, thus eliminating the use of expensive and hazardous organic precipitants. We have found that these water soluble esters are suitable as solvents for various types of cellulose esterification processes, such as, for example, those in which partially deacetylated cellulose acylates such as commercially available acetone soluble cellulose acetates are employed as the initial cellulosic material. We have found that these esters are also suitable for use as solvents in reaction mixtures for the esterification of cellulose itself. Our solvent may be used in the production of mixed esters of cellulose in which either acid anhydrides such as acetic anhydride, the higher fatty acid anhydrides such as stearic anhydride or the substituted fatty acid anhydrides such as chloracetic or alkoxyacetic anhydride are employed. It is necessary in this procedure that all components of the esterification mixture either be water soluble or if water insoluble, have melting points above ordinary room temperatures so that they will be precipitated by the water as solid products.

Our solvent is of special value in the esterification of the lower fatty acid esters of cellulose containing free and esterifiable hydroxyl groups so as to combine higher fatty acid groups such as stearyl therewith. By our invention, for instance, a reaction product from the preparation of cellulose acetate stearate by the reaction of stearic anhydride upon partially de-esterified cellulose acetate in a water soluble aliphatic ester such as beta-methoxyethyl acetate would give on addition of water a precipitate of the cellulose acetate stearate containing as an impurity some stearic acid or anhydride if present in the reaction mixture. This precipitated product could be washed with water to remove soluble material such as the aliphatic ester or any trace of catalyst and then dried. The stearic acid could then be removed in a separate purification step in which other ingredients of the reaction mixture are not involved.

It is preferable in the separation of the ester from its reaction mixture or the washing thereof that a purified water such as distilled water be employed to prevent the formation of mineral salts of the stearic acid which are more difficult to remove than that acid itself. In accordance with the present invention a small amount of water might be added to the finished reaction mixture to cause hydrolysis of the ester prepared therein without precipitating it. In addition to beta-methoxyethyl acetate some of the other water soluble esters which would be suitable for use in the present process are beta-ethoxyethyl acetate, methyl methoxy acetate, ethyl methoxy acetate, methyl ethoxy acetate and ethyl ethoxy acetate. The following examples illustrate specific embodiments of the present invention:

Example I

A solution of 50 parts of cellulose acetate having an acetyl content of 38% in a mixture of 500 parts of beta-methoxyethyl acetate, 100 parts of stearic anhydride and 5 parts of benzenesulfonic acid was held at 70° C. until a precipitated sample showed that the product formed was soluble in hot toluene. The solution was then precipitated by pouring with stirring into about twice its volume of distilled water. The precipitated product was washed with distilled water until free from soluble organic material and then dried. The dried product was then extracted with methyl alcohol until it was free from stearic acid.

Example II

A solution of 50 parts of cellulose acetate of 38% acetyl content in a mixture of 250 parts of beta-methoxyethyl acetate and 100 parts of methoxyacetic anhydride was heated to 70° C. 2½ parts of benzenesulfonic acid and 50 parts of stearic acid were added thereto and the mixture was held at 70° C. and stirred for approximately six hours. It was then precipitated by pouring it with stirring into twice its volume of distilled water. The precipitated product was washed with distilled water and dried. The dried material was then extracted with methyl alcohol to remove uncombined stearic acid.

*Example III*

The procedure described in Example II was repeated and instead of precipitating the product formed, there was added to the reaction mixture a solution of 180 parts of beta-methoxyethyl acetate, 33 parts of water, and one part by volume of sulfuric acid. The whole was held at 45° C. for four days, after which time it was precipitated in distilled water, washed with distilled water and dried. The product was then extracted with methyl alcohol to remove any unreacted stearic acid which might be present. The product was found to be soluble in acetone but insoluble in ethylene chloride, propylene chloride, and butyl acetate. The unhydrolyzed product prepared in accordance with Example II was soluble in all of these solvents.

In order to recover the organic solvents from the precipitation liquor, the filtrate from Example II was distilled. The first part of the distillate consisted of an azeotropic mixture of beta-methoxyethyl acetate and water. This was followed by a fraction consisting of water in excess over that comprising the azeotropic mixture and finally there remained a residue of benzene sulfonic acid and methoxyacetic acid. The methoxyacetic acid was removed as a pure product by distillation under reduced pressure, leaving a small residue of the less volatile benzene sulfonic acid. The azeotropic mixture of beta-methoxyethyl acetate was separately treated to recover it from its aqueous solution.

*Example IV*

The procedure described in Example II was followed except that methyl methoxyacetate was used in place of beta-methoxyethyl acetate. A product soluble in acetone, ethylene chloride, propylene chloride and butyl acetate was obtained.

*Example V*

10 parts of refined cotton linters were placed in a mixture of 50 parts of chloracetic anhydride, 15 parts of stearic acid, 5 parts of acetic acid, 50 parts of beta-methoxyethyl acetate and 1 c. c. of phosphoric acid. The whole was maintained at 60° C. with gentle stirring until the cellulose went into solution. The ester was separated from the reaction mixture by precipitation in water. The product was then washed and dried and the uncombined stearic acid was extracted with methyl alcohol as specified in the preceding examples.

Although, as stated above, the present invention is particularly adapted for the preparation of the mixed esters of cellulose containing the higher fatty acid groups, such as cellulose acetate stearate, cellulose acetate-laurate and the like, other mixed esters, in which the acyl present is derived from the lower fatty acids, may be prepared thereby providing, of course, that the components of the reaction mixture are either water soluble or that the materials employed have a melting point above ordinary room temperature. In some of the examples, the use of cellulose acetate having an acetyl content of 38% is specified, however, as pointed out, these examples are merely illustrative and are not intended to limit the invention to the use of cellulose acetate of any particular acetyl content. Other cellulose derivatives such as cellulose ethers or cellulose proprionate, cellulose butyrate, or the like which contain esterifiable hydroxyl groups might be employed as the starting material in such a process instead of cellulose acetate.

What we claim as our invention and desire to secure by Letters Patent of the United States is:

1. The process of preparing a mixed fatty acid ester of cellulose by reacting upon cellulose with an esterification bath containing an organic acid anhydride, fatty acid groups some but not all of which contain at least 12 carbon atoms, an acylation catalyst and a beta-alkoxyalkyl acetate as the solvent, all the components of which bath are either water soluble or if water insoluble, have melting points above 20° C.

2. The process of preparing a mixed fatty acid ester of cellulose by reacting upon cellulose with an esterification bath containing an organic acid anhydride, fatty acid groups some but not all of which contain at least 12 carbon atoms, an acylation catalyst and a beta-methoxyethyl acetate as the solvent, all the components of which bath are either water soluble or if water insoluble, have melting points above 20° C.

3. The process of preparing a mixed fatty acid ester of cellulose containing fatty acid groups of at least 12 carbon atoms which comprises reacting upon cellulose with an esterifying bath containing an organic acid anhydride, fatty acid groups some but not all of which contain at least 12 carbon atoms, an acylation catalyst and a beta-alkoxyalkyl acetate as the solvent.

4. The process of preparing a mixed fatty acid ester of cellulose containing fatty acid groups of at least 12 carbon atoms which comprises reacting upon cellulose with an esterifying bath containing an organic acid anhydride, fatty acid groups some but not all of which contain at least 12 carbon atoms, an acylation catalyst and a beta-methoxyalkyl acetate as the solvent.

5. The process of preparing cellulose acetate stearate which comprises reacting upon cellulose with an esterifying bath containing chloracetic anhydride, stearic and acetic acids, an acylation catalyst and a beta-alkoxyalkyl acetate as the solvent.

6. The process of preparing cellulose acetate stearate which comprises reacting upon cellulose acetate, having free and esterifiable hydroxyl groups, with an esterifying bath comprising stearic anhydride, an acylation catalyst and a beta-alkoxyalkyl acetate as the solvent.

7. The process of preparing a mixed fatty acid ester of cellulose containing fatty acid groups of at least 12 carbon atoms which comprises reacting upon esterifiable cellulosic material with an esterifying bath containing organic acid anhydride, fatty acid groups of at least 12 carbon atoms, an acylation catalyst and a beta-alkoxyalkyl acetate as the solvent.

CHARLES R. FORDYCE.
JOHN EMERSON.